(12) United States Patent
Jung

(10) Patent No.: US 11,866,072 B2
(45) Date of Patent: Jan. 9, 2024

(54) METHOD AND DEVICE FOR CONTROLLING AUTONOMOUS DRIVING

(71) Applicants: HYUNDAI MOTOR COMPANY, Seoul (KR); KIA CORPORATION, Seoul (KR)

(72) Inventor: Chan Hee Jung, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 106 days.

(21) Appl. No.: 17/409,186

(22) Filed: Aug. 23, 2021

(65) Prior Publication Data

US 2022/0144307 A1    May 12, 2022

(30) Foreign Application Priority Data

Nov. 10, 2020 (KR) .................. 10-2020-0149545

(51) Int. Cl.
    *B60W 60/00*     (2020.01)
    *B60W 50/16*     (2020.01)
    (Continued)

(52) U.S. Cl.
    CPC ........ *B60W 60/005* (2020.02); *B60W 50/082* (2013.01); *B60W 50/087* (2013.01);
    (Continued)

(58) Field of Classification Search
CPC ............. B60W 60/005; B60W 50/082; B60W 50/087; B60W 50/16; B60W 60/0015; B60W 2050/0067; B60W 2050/143; B60W 2050/146; B60W 50/14; B60W 2540/215; B60W 60/0055; B60W 2556/50; B60W 60/001; B60W 60/00182; B60W 60/00184; B60W 60/0059; B60W 2552/05; B60W 2552/53; B60W 2555/20; B60W 60/0051; B60W 40/02; B60W 50/10; B60W 2556/40; B60W 2556/45; B60K 35/00; B60K 2370/11; B60K 2370/152; B60K 2370/175; G05D 1/0061; G05D 1/0088; G05D 2201/0213
See application file for complete search history.

(56) References Cited

U.S. PATENT DOCUMENTS 10,913,464 B1 *   2/2021   Qiao .................... B60W 50/14
10,970,746 B2 *   4/2021   Singhal ............. B60W 30/0956
(Continued)

*Primary Examiner* — Jason Holloway
*Assistant Examiner* — Madison B Emmett
(74) *Attorney, Agent, or Firm* — MORGAN, LEWIS & BOCKIUS LLP

(57) ABSTRACT

A method and a device for controlling autonomous driving in an autonomous driving vehicle are provided. The method may include collecting state recognition information during travel, receiving information on a driver-requested automation level, determining a currently applicable maximum automation level based on the collected state recognition information, comparing the driver-requested automation level with the currently applicable maximum automation level to determine whether automation level downward adjustment is required, and adjusting an automation level downward to perform the autonomous driving when it is determined that the automation level downward adjustment is required.

20 Claims, 8 Drawing Sheets

| AUTOMATION LEVEL | SAE CLASSIFICATION CRITERIA | SYSTEM ROLE | DRIVER ROLE |
|---|---|---|---|
| LEVEL 0 | NO AUTOMATION | PERFORM TEMPORARY EMERGENCY INTERVENTION OR PROVIDE WARNING ONLY | DRIVER PERFORMS ALL DRIVING |
| LEVEL 1 | DRIVER ASSISTANCE | PERFORM SOME TRAVEL FUNCTIONS SUCH AS STEERING, ACCELERATION/DECELERATION, AND THE LIKE TOGETHER UNDER BOARDING OF DRIVER WHO PERFORMS TRAVEL FUNCTION IN NORMAL OPERATION SECTION | DRIVER DETERMINES WHETHER/WHEN TO OPERATE LEVEL 1 SYSTEM AND PERFORMS ALL DRIVING EXCEPT STEERING WHEEL OR ACCELERATION/DECELERATION PEDAL CONTROL AND TRAVEL ENVIRONMENT MONITORING (INCLUDING TRAVEL ENVIRONMENT/VEHICLE DRIVING/LEVEL 1 SYSTEM MONITORING AND IMMEDIATE EMERGENCY PREPARATION) |
| LEVEL 2 | PARTIAL AUTOMATION | PERFORM TRAVEL FUNCTION SUCH AS STEERING, ACCELERATION/DECELERATION, AND THE LIKE INSTEAD OF DRIVER WHO IS MONITORING STEERING AND ACCELERATION/DECELERATION DEVICES UNDER BOARDING OF DRIVER | DRIVER DETERMINES WHETHER/WHEN TO OPERATE SYSTEM AND PERFORMS ALL DRIVING EXCEPT STEERING WHEEL OR ACCELERATION/DECELERATION PEDAL CONTROL (INCLUDING TRAVEL ENVIRONMENT/VEHICLE DRIVING/ MONITORING AND IMMEDIATE EMERGENCY PREPARATION) |
| LEVEL 3 | CONDITIONAL AUTOMATION | TRANSFER RIGHT TO CONTROL TRAVEL TO DRIVER IN SITUATION OUTSIDE CONDITION AND PERFORM TRAVEL FUNCTION SUCH AS STEERING, ACCELERATION/DECELERATION, AND THE LIKE | DRIVER DETERMINES WHETHER/WHEN TO OPERATE SYSTEM AND PERFORMS ALL DRIVING EXCEPT STEERING WHEEL OR ACCELERATION/DECELERATION PEDAL CONTROL (DRIVER IS ABLE TO PREPARE EMERGENCY BY NECESSARILY RECEIVING RIGHT TO CONTROL WHEN LEVEL 3 SYSTEM REQUESTS CONTROL TO RIGHT TRANSFER) |
| LEVEL 4 | HIGH AUTOMATION | SYSTEM PERFORMS ALL TRAVEL FUNCTIONS UNDER BOARDING OF DRIVER FOR EXTREMELY EXCEPTIONAL SITUATION | DRIVER MAY SELECTIVELY PREPARE EMERGENCY WHEN LEVEL 4 SYSTEM REQUESTS RIGHT TO CONTROL TRANSFER |
| LEVEL 5 | FULL AUTOMATION | PERFORM COMPLETE TRAVEL FUNCTION CAPABLE OF RESPONDING TO ALL SITUATIONS WITHOUT DRIVER | DRIVER ONLY DETERMINES WHETHER TO OPERATE SYSTEM BUT DOESN'T PERFORM ALL DRIVING |

(51) Int. Cl.
*B60W 50/08* (2020.01)
*B60W 50/14* (2020.01)
*B60W 50/00* (2006.01)

(52) U.S. Cl.
CPC ........ *B60W 50/16* (2013.01); *B60W 60/0015* (2020.02); *B60W 2050/0067* (2013.01); *B60W 2050/143* (2013.01); *B60W 2050/146* (2013.01)

(56) References Cited

U.S. PATENT DOCUMENTS

| | | | |
|---|---|---|---|
| 11,353,866 B2* | 6/2022 | Obata | B60W 60/0059 |
| 2016/0207537 A1* | 7/2016 | Urano | B60W 50/10 |
| 2017/0088143 A1* | 3/2017 | Goldman-Shenhar | G05D 1/0088 |
| 2017/0349186 A1* | 12/2017 | Miller | B60W 50/14 |
| 2018/0141568 A1* | 5/2018 | Singhal | G01S 13/865 |
| 2018/0203451 A1* | 7/2018 | Cronin | B60W 60/0011 |
| 2018/0239352 A1* | 8/2018 | Wang | B60W 60/0053 |
| 2018/0292833 A1* | 10/2018 | You | G05D 1/0212 |
| 2020/0139979 A1* | 5/2020 | Kawanai | B62D 15/025 |
| 2020/0139992 A1* | 5/2020 | Oba | G08G 1/16 |
| 2020/0231182 A1* | 7/2020 | Oba | B60W 40/09 |
| 2020/0317228 A1* | 10/2020 | Otake | B60W 60/005 |
| 2021/0009126 A1* | 1/2021 | Yashiro | B60W 30/143 |
| 2022/0126864 A1* | 4/2022 | Moustafa | G08G 1/096758 |
| 2022/0212685 A1* | 7/2022 | Oba | B60W 50/0098 |
| 2022/0340156 A1* | 10/2022 | Yamamoto | B60W 60/0016 |

* cited by examiner

| AUTOMATION LEVEL | SAE CLASSIFICATION CRITERIA | SYSTEM ROLE | DRIVER ROLE |
|---|---|---|---|
| LEVEL 0 | NO AUTOMATION | PERFORM TEMPORARY EMERGENCY INTERVENTION OR PROVIDE WARNING ONLY | DRIVER PERFORMS ALL DRIVING |
| LEVEL 1 | DRIVER ASSISTANCE | PERFORM SOME TRAVEL FUNCTIONS SUCH AS STEERING, ACCELERATION/DECELERATION, AND THE LIKE TOGETHER UNDER BOARDING OF DRIVER WHO PERFORMS TRAVEL FUNCTION IN NORMAL OPERATION SECTION | DRIVER DETERMINES WHETHER/WHEN TO OPERATE LEVEL 1 SYSTEM AND PERFORMS ALL DRIVING EXCEPT STEERING WHEEL OR ACCELERATION/DECELERATION PEDAL CONTROL AND TRAVEL ENVIRONMENT MONITORING (INCLUDING TRAVEL ENVIRONMENT/VEHICLE DRIVING/LEVEL 1 SYSTEM MONITORING AND IMMEDIATE EMERGENCY PREPARATION) |
| LEVEL 2 | PARTIAL AUTOMATION | PERFORM TRAVEL FUNCTION SUCH AS STEERING, ACCELERATION/DECELERATION, AND THE LIKE INSTEAD OF DRIVER WHO IS MONITORING STEERING AND ACCELERATION/DECELERATION DEVICES UNDER BOARDING OF DRIVER | DRIVER DETERMINES WHETHER/WHEN TO OPERATE SYSTEM AND PERFORMS ALL DRIVING EXCEPT STEERING WHEEL OR ACCELERATION/DECELERATION PEDAL CONTROL (INCLUDING TRAVEL ENVIRONMENT/VEHICLE DRIVING/ MONITORING AND IMMEDIATE EMERGENCY PREPARATION) |
| LEVEL 3 | CONDITIONAL AUTOMATION | TRANSFER RIGHT TO CONTROL TRAVEL TO DRIVER IN SITUATION OUTSIDE CONDITION AND PERFORM TRAVEL FUNCTION SUCH AS STEERING, ACCELERATION/DECELERATION, AND THE LIKE | DRIVER DETERMINES WHETHER/WHEN TO OPERATE SYSTEM AND PERFORMS ALL DRIVING EXCEPT STEERING WHEEL OR ACCELERATION/DECELERATION PEDAL CONTROL (DRIVER IS ABLE TO PREPARE EMERGENCY BY NECESSARILY RECEIVING RIGHT TO CONTROL WHEN LEVEL 3 SYSTEM REQUESTS CONTROL TO RIGHT TRANSFER) |
| LEVEL 4 | HIGH AUTOMATION | SYSTEM PERFORMS ALL TRAVEL FUNCTIONS UNDER BOARDING OF DRIVER FOR EXTREMELY EXCEPTIONAL SITUATION | DRIVER MAY SELECTIVELY PREPARE EMERGENCY WHEN LEVEL 4 SYSTEM REQUESTS RIGHT TO CONTROL TRANSFER |
| LEVEL 5 | FULL AUTOMATION | PERFORM COMPLETE TRAVEL FUNCTION CAPABLE OF RESPONDING TO ALL SITUATIONS WITHOUT DRIVER | DRIVER ONLY DETERMINES WHETHER TO OPERATE SYSTEM BUT DOESN'T PERFORM ALL DRIVING |

Fig. 1

METHOD AND DEVICE FOR CONTROLLING AUTONOMOUS DRIVING

CROSS-REFERENCE TO RELATED APPLICATION

The present application claims the priority to and the benefit of Korean Patent Application No. 10-2020-0149545, filed on Nov. 10, 2020, the entire contents of which are incorporated herein by reference.

TECHNICAL FIELD

The present disclosure relates to autonomous vehicle control, and more particularly, to an autonomous driving control technology capable of adaptively controlling automation levels without deactivating the autonomous driving based on various information recognized during travel.

BACKGROUND

An autonomous vehicle may be desired to have an ability to adaptively cope with a surrounding situation that changes in real time during travel.

For mass production and invigoration of the autonomous vehicle, a reliable determination control function is required above all.

Semi-autonomous vehicles that have been recently released basically perform driving, braking, and steering on behalf of a driver to reduce fatigue of the driver.

In a case of semi-autonomous driving, unlike fully autonomous driving, the driver has to stay focus on driving such as continuously holding a steering wheel and the like.

Recently, the semi-autonomous vehicles are being sold with a highway driving assist (HDA) function, a driver status warning (DSW) function that determines driver carelessness and state abnormalities such as drowsy driving, distraction, and the like to output a warning alarm through a cluster and the like, a driver awareness warning (DAW) function that determines whether the vehicle crosses a line and travels unstably through a front camera and the like, a forward collision-avoidance assist (FCA) or an active emergency brake system (AEBS) function that performs sudden braking when detecting a forward collision, and the like.

An autonomous driving system may operate a corresponding autonomous driving function in a state in which several operation conditions are satisfied.

When the operation conditions required for autonomous driving are not satisfied, a conventional autonomous driving system had to wait by performing manual travel until the operation conditions are satisfied.

SUMMARY

An aspect of the present disclosure provides a method and a device for controlling autonomous driving.

Another aspect of the present disclosure provides a method and a device for controlling autonomous driving capable of performing autonomous driving by adjusting an automation level downward to a currently applicable maximum automation level even when operation conditions corresponding to a driver-requested automation level are not satisfied without waiting for the operation conditions to be satisfied.

Another aspect of the present disclosure provides a method and a device for controlling autonomous driving capable of safely switching the automation level by adaptively performing guide message output and/or driver confirmation procedures when automation level adjustment is required.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a method for controlling autonomous driving in a device for controlling the autonomous driving includes collecting state recognition information during travel, receiving information on a driver-requested automation level, determining a currently applicable maximum automation level based on the collected state recognition information, comparing the driver-requested automation level with the currently applicable maximum automation level to determine whether automation level downward adjustment is required, and adjusting an automation level downward compared to the driver-requested automation level to perform the autonomous driving when the automation level downward adjustment is required as the result of the determination.

In one implementation, the state recognition information may include at least one of external environment recognition information, travel state recognition information, driver state recognition information, precise map information, and/or vehicle operation state information.

In one implementation, the method may further include displaying on a screen a first message including a corresponding automation level change guide phrase and buttons for determining whether a driver accepts a corresponding automation level downward change when the automation level downward adjustment is required as the result of the determination.

In one implementation, the method may further include adjusting the driver-requested automation level downward to the currently applicable maximum automation level to perform the autonomous driving when an acceptance response of the driver for the automation level downward adjustment is received.

In one implementation, the method may further include temporarily blocking activation of an autonomous driving mode when a rejection response of the driver for the automation level downward adjustment is received.

In one implementation, the method may further include determining whether automation level upward adjustment is possible based on the state recognition information during the autonomous driving at the downwardly adjusted automation level, and displaying on a screen a second message including a corresponding automation level upward adjustment guide phrase when the automation level upward adjustment is possible.

In one implementation, a driver confirmation procedure may not be performed during the automation level upward adjustment.

In one implementation, at least one of the automation level downward change and/or the automation level upward change may include an automation level change in units of levels equal to or higher than 2.

In one implementation, the method may further include changing the automation level based on a driver response signal received through a human machine interface (HMI) after outputting a first message.

In one implementation, the external environment recognition information may include at least one of line recognition state information, current travel road type information, current travel road traffic volume information, current travel road accident and construction information, current weather information, and/or communication state information.

According to another aspect of the present disclosure, a device for controlling autonomous driving includes a recognition device that collects state recognition information during travel, an input device that receives information on a driver-requested automation level, a determination device that determines a currently applicable maximum automation level based on the collected state recognition information, and compares the driver-requested automation level with the currently applicable maximum automation level to determine whether automation level downward adjustment is required, and a change device that adjusts an automation level downward compared to the driver-requested automation level to perform the autonomous driving when the automation level downward adjustment is required as the result of the determination.

In one implementation, the state recognition information may include at least one of external environment recognition information, travel state recognition information, driver state recognition information, precise map information, and/or vehicle operation state information.

In one implementation, the device may further include a display device that displays a first screen including a corresponding automation level change guide phrase and buttons for determining whether a driver accepts a corresponding automation level downward change when the automation level downward adjustment is required as the result of the determination.

In one implementation, the driver-requested automation level may be adjusted downward to the currently applicable maximum automation level to perform the autonomous driving when an acceptance response of the driver for the automation level downward adjustment is received.

In one implementation, activation of an autonomous driving mode may be temporarily blocked when a rejection response of the driver for the automation level downward adjustment is received.

In one implementation, the determination device may determine whether automation level upward adjustment is possible based on the state recognition information during the autonomous driving at the downwardly adjusted automation level, and the display device may display a second screen including a corresponding automation level upward adjustment guide phrase when the automation level upward adjustment is possible.

In one implementation, a driver confirmation procedure may not be performed during the automation level upward adjustment.

In one implementation, at least one of the automation level downward change and/or the automation level upward change may include an automation level change in units of levels equal to or higher than 2.

In one implementation, the automation level may be changed based on a driver response signal received through a human machine interface (HMI) after displaying the first screen and the second screen.

In one implementation, the external environment recognition information may include at least one of line recognition state information, current travel road type information, current travel road traffic volume information, current travel road accident and construction information, current weather information, and/or communication state information.

The technical problems to be solved by the present inventive concept are not limited to the aforementioned problems, and any other technical problems not mentioned herein will be clearly understood from the following description by those skilled in the art to which the present disclosure pertains.

DRAWINGS

The above and other objects, features and advantages of the present disclosure will be more apparent from the following detailed description taken in conjunction with the accompanying drawings:

FIG. 1 is a table in which automation levels of an autonomous vehicle are defined;

DETAILED DESCRIPTION

Figure 2:
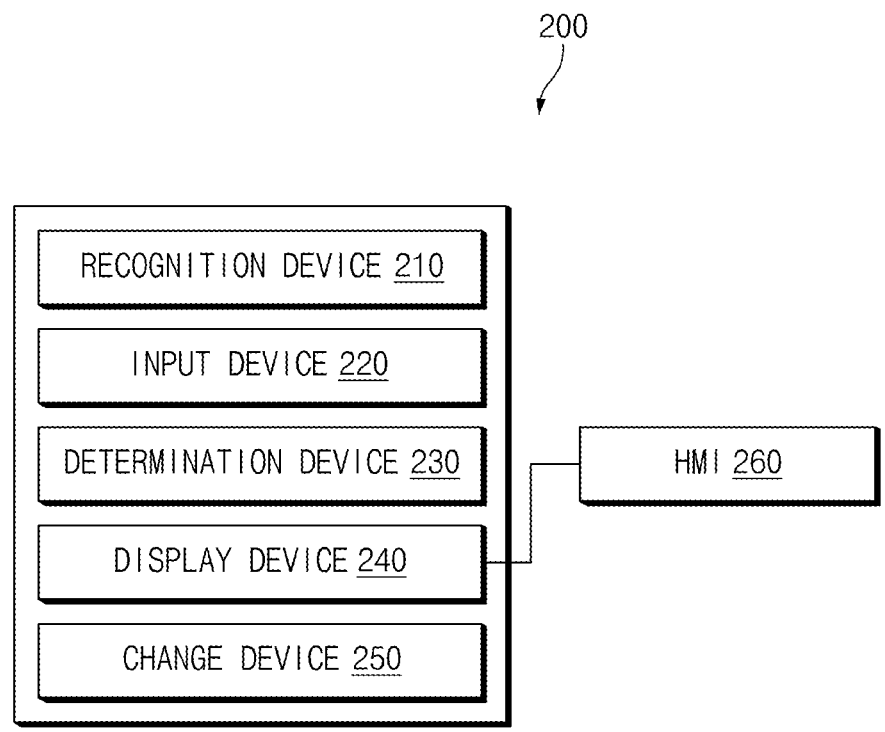
FIG. 2 is a block diagram for illustrating a structure of an autonomous driving controller in one form of the present disclosure.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the form of the present disclosure, a detailed description of well-known features or functions will be ruled out in order not to unnecessarily obscure the gist of the present disclosure.

In describing some forms of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, forms of the present disclosure will be described in detail with reference to FIGS. 1 to 8.

FIG. 1 is a table in which automation levels of an autonomous vehicle are defined.

The autonomous vehicle refers to a vehicle that recognizes a travel environment by itself to determine a risk, minimizes travel manipulation of a driver while controlling a travel route, and drives by itself.

Ultimately, the autonomous vehicle refers to a vehicle capable of traveling, controlling, and parking without an influence of humans, and is focused on a vehicle in a state in which an autonomous driving technology, which is a core foundation of the autonomous driving autonomous vehicle,—that is, an ability to operate the vehicle without active control or monitoring of the driver is the most advanced.

Referring to FIG. 1, in an automation step level 0 to 2, the travel environment is monitored by the driver. On the other hand, in an automation step level 3 to 5, the travel environment is monitored by an automated travel system.

However, a concept of the autonomous vehicle currently being released may include an automation step of an intermediate step to the autonomous vehicle in a full sense, and corresponds to a goal-oriented concept on the premise of mass production and commercialization of a fully autonomous vehicle.

An autonomous driving control method according to the present disclosure may be applied to an autonomous vehicle corresponding to the level 2 (partial autonomous driving) and the level 3 (conditional autonomous driving) among automation steps of the autonomous driving shown in FIG. 1. However, the present disclosure may not be necessarily limited thereto, and the autonomous driving control method may be applied to an autonomous vehicle supporting a plurality of various automation steps.

The automation level of the autonomous vehicle based on the society of automotive engineers (SAE), which is an American association of automotive Engineers, may be classified as shown in the table in FIG. 1.

FIG. 2 is a block diagram for illustrating a structure of an autonomous driving controller in some forms of the present disclosure.

Referring to FIG. 2, an autonomous driving controller 200 may include a recognition device 210, an input device 220, a determination device 230, a display device 240, and a change device 250.

The autonomous driving controller 200 may output a guide message related to a change in the automation level in association with a human machine interface (HMI) 260 or receive a response to whether the driver accepts the change in the automation level.

When autonomous driving operation is required in initial manual travel, the driver may request autonomous driving at a specific automation level to an autonomous driving system through a predetermined user interface—for example, a button input, a touch screen input, a voice input, and the like.

In this connection, the autonomous driving system may not be able to perform the autonomous driving at the automation level requested by the driver for various reasons below.
  a temporary failure of the vehicle: a sensor failure, a temporary failure of a specific controller, a communication problem of the specific controller, and the like
  environmental condition dissatisfaction: A current travel line is not properly recognized, or a current travel road does not meet the autonomous driving operation conditions of the corresponding automation level.
  vehicle travel state dissatisfaction: Operating vehicle speed conditions of the autonomous driving system are not met. Vertical/lateral acceleration and the like of the vehicle is not the operation condition.

The recognition device 210 may recognize an external environment and a travel state.

External environment recognition information may include line recognition state information, current travel road type information, current travel road traffic volume information, current travel road accident and construction information, current weather information, communication state information, and the like.

Travel state recognition information may include current travel speed information, vehicle speed behavior state information, vehicle operation state information, and the like. For example, the vehicle operation state information may include driving state information of a system necessary for the autonomous driving such as operation state information of a sensor such as a camera/a radar/a lidar, actuator operation state information, and the like.

The input device 220 may receive information on the automation level requested by the driver through input means equipped in the vehicle. As an example, the input means may include a button, a jog wheel, a switch, the touch screen input, voice recognition, and the like, but may not be limited thereto.

The determination device 230 may determine a currently operable autonomous driving level—that is, the automation level—based on the recognition result of the recognition device 210.

For example, the determination device 230 may compare a predetermined state value "A" with a minimum state value "B" defined for each automation level to determine a currently operable maximum automation level.

In this connection, the state value "A" may be determined based on the various recognition information described above. In this connection, the determination device 230 may apply a predetermined weight for each recognition information to determine the state value "A".

When the currently operable automation level is lower than the automation level requested by the driver, the determination device 230 may determine that downward adjustment of the automation level compared to the driver-requested automation level is required.

The display device 240 may configure a predetermined screen for guiding the automation level downward adjustment and identifying acceptance of the automation level downward adjustment from the driver based on the determination result of the determination device 230.

When the operable automation level increases after the automation level is adjusted downward, the determination device 230 may configure a predetermined screen for guiding automation level upward adjustment and identifying acceptance of the automation level upward adjustment from the driver. In this connection, when the currently operable maximum automation level is higher than the driver-requested automation level, the determination device 230 may control the automation level to be adjusted upward to the driver-requested automation level.

When the currently operable maximum automation level is lower than the driver-requested automation level and higher than the currently active automatic level, the determination device 230 may control the automation level to be adjusted upward to the currently operable maximum automation level.

The screen configured on the display device 240 may be output through the HMI 260.

When the automation level downward adjustment or the automation level upward adjustment is accepted by the driver, the change device 250 may adjust the automation level downward or upward in response to a control signal of the determination device 230.

For example, the display device 240 may output an automation level change driver confirmation request message on a screen of the HMI 260 when it is determined by the determination device 230 that automation level downward adjustment is required, and the display device 240 may output an automation level change information notification message on the screen of the HMI 260 when it is determined by the determination device 230 that the automation level upward adjustment is required.

When the automation level is required to be adjusted downward to be lower than the automation level requested by the driver based on the recognition result, because more attention is required to the driver, the autonomous driving controller 200 may perform a predetermined automation level change confirmation procedure to safely adjust the automation level downward only when the acceptance of the driver is identified.

On the other hand, when the automation level is required to be adjusted upward to the automation level requested by the driver based on the recognition result during autonomous driving at the downwardly adjusted level, because less attention of the driver is required compared to the currently active automation level, the autonomous driving controller 200 may control only an automation level upward adjustment guide message to be output without the separate driver confirmation procedure for the change in the automation level.

In one example, it should be noted that the present disclosure may be implemented such that the driver confirmation procedure may be performed even in the case of the automation level upward adjustment based on a design of a person skilled in the art.

As described above, the autonomous driving controller 200 according to the present disclosure may dynamically change the automation level without deactivating an autonomous driving mode based on the result of the recognition of the external environment, the travel environment, and the like, thereby providing a continuous autonomous driving environment to the driver.

Figure 3:
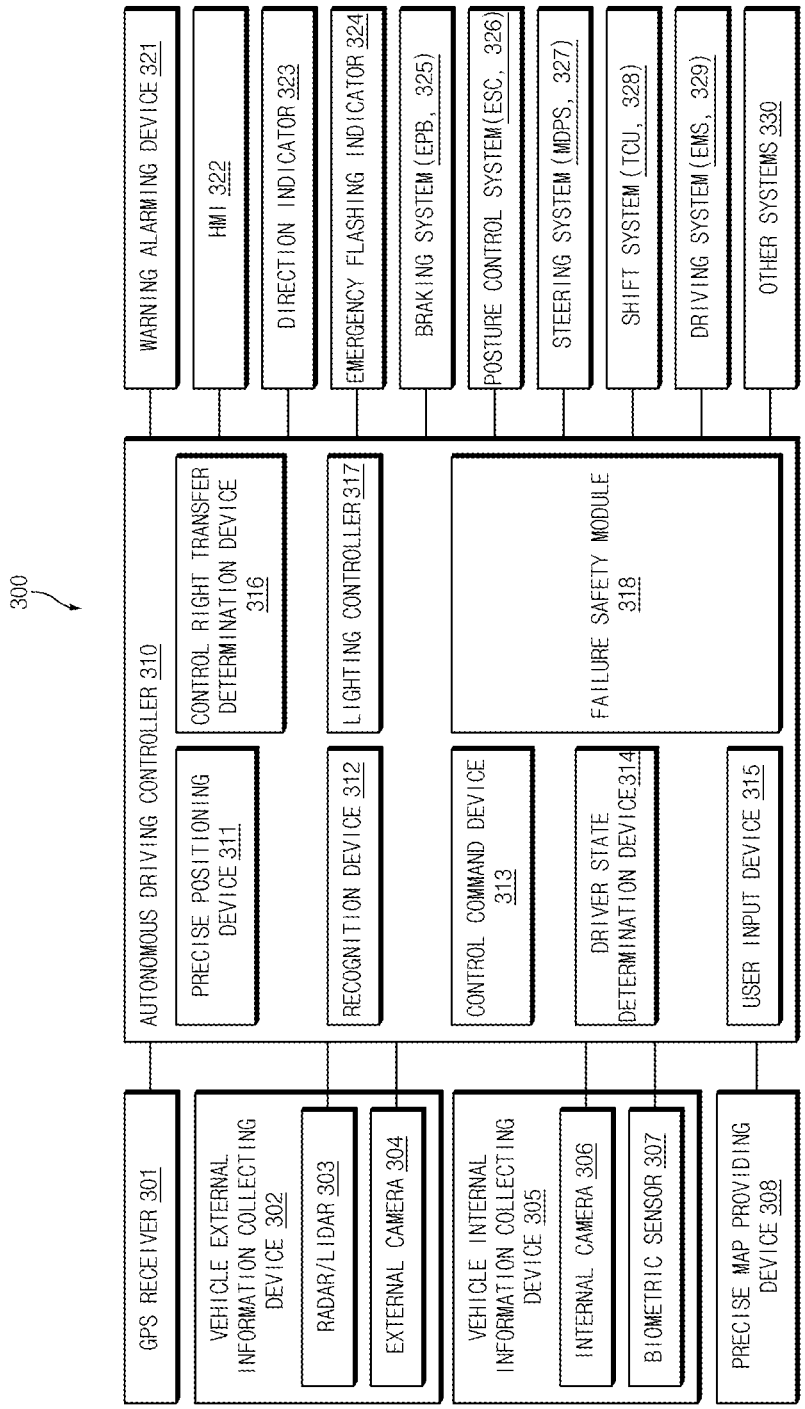
FIG. 3 is a block diagram for illustrating a structure of an autonomous driving control device in one form of the present disclosure.

FIG. 3 is a block diagram for illustrating a structure of an autonomous driving control device in some forms of the present disclosure.

An autonomous driving control device 300 according to FIG. 3 may be mounted on an autonomous vehicle supporting an automation level equal to or higher than the level 2.

For convenience of description below, the autonomous driving control device 300 will be described by being simply referred to as the device 300.

Referring to FIG. 3, the device 300 may include a global positioning system (GPS) (or a global navigation satellite system (GNSS)) receiver 301, a vehicle external information collecting device 302, a vehicle internal information collecting device 305, a precise map providing device 308, an autonomous driving controller 310, a warning alarming device 321, a human machine interface (HMI) 322, a direction indicator 323, an emergency flashing indicator 324, a braking system 325, a posture control system 326, a steering system 327, a shift system 328, a driving system 329, and other systems 330.

Systems in association with the autonomous driving controller 310 are respectively equipped with control devices to monitor whether the systems are failed, and transmit the monitoring results to a failure safety module 318 of the autonomous driving controller 310.

The GPS receiver 301 may receive a positioning signal from a positioning satellite. In this connection, the positioning signal may be used to generate geographic location information of the vehicle.

The vehicle external information collecting device 302 may collect vehicle surrounding environment information and travel state information. The vehicle external information collecting device 302 may include a radar and a lidar 303, and an external camera 304.

The radar/lidar 303 may sense an object around the vehicle.

The radar/lidar 303 may sense objects in front of, to side, and at the rear of the vehicle, and calculate distances to the sensed objects.

In addition, the radar/lidar 303 may distinguish whether the sensed object is a static object or a dynamic object, measure a moving speed of the sensed dynamic object, and distinguish whether the sensed dynamic object is a pedestrian or a vehicle.

In addition, the radar/lidar 303 may be used for purposes such as identifying a state of a travel road and a facility through a high-resolution terrain scan.

The external camera 304 may be mounted on an exterior of the vehicle to take images of regions in front of, to side, and at the rear of the vehicle. To this end, the vehicle may be equipped with a plurality of external cameras.

The image taken by the external camera 304 may be used for line distinguishment, identification of the object around the vehicle, implementation of augmented reality, and the like.

The vehicle internal information collecting device 305 may collect various state information inside the vehicle.

The vehicle internal information collecting device 305 may include an internal camera 306 and a biometric sensor 307.

The internal camera 306 may be mounted on one side of an interior of the vehicle to photograph the driver and an occupant.

An image captured by the internal camera 306 may be used for monitoring a gaze direction of the driver, a state of the driver—for example, driver distraction, fatigue, drowsy driving, and the like.

The biometric sensor 307 may be mounted on one side of the vehicle to collect various biometric information of the driver.

The biometric sensor 307 may be in association with a wearable device of the driver to collect the various biometric information of the driver.

For example, the biometric information may include pulse information, heart rate monitoring information, body temperature information, blood alcohol concentration information, brainwave information, fingerprint recognition information, iris recognition information, and the like, but may not be limited thereto.

The biometric information may be used for determining a driving inability state, a drunk driving state, a drowsy driving state, and the like.

The precise map providing device 308 may provide precise map information stored in a (internal or external) database in response to a request of the autonomous driving controller 310.

The autonomous driving controller 310 may include a precise positioning device 311, a recognition device 312, a control command device 313, a driver state determination device 314, a user input device 315, a control right transfer determination device 316, a lighting controller 317, and the failure safety module 318.

The precise positioning device 311 may determine a current location of a host vehicle using positioning signal information received from the GPS receiver 301 and the precise map information obtained from the precise map providing device 308, and map the determined current location of the host vehicle on a precise map.

In addition, the precise positioning device 311 may identify state information—for example, a gradient, a road type, the number of lines, a speed limit, and the like—of a travel road of the host vehicle.

The recognition device 312 may recognize the line, the vehicle around the vehicle, an obstacle around the vehicle, the pedestrian, and the like based on sensing information from the radar/lidar 303 and image information captured by the external camera 304.

The recognition device 312 may be in association with the braking system 325, the posture control system 326, the steering system 327, the shift system 328, the driving system 329, and the like to recognize the travel state such as the vehicle speed, the vehicle speed behavior state (e.g., vertical/lateral acceleration), and the like of the vehicle.

The recognition device 312 may be in association with the failure safety module 318 and the like to recognize the operation states of the various sensors and actuators arranged in the vehicle.

The control command device 313 may calculate a request command value based on the recognition result of the recognition device 312, and transmit the calculated request command value to the corresponding autonomous driving system to perform travel control.

The control command device 313 may determine a currently applicable maximum automation level based on the recognition result of the recognition device 312, and compare the determined maximum automation level with the automation level requested by the driver to dynamically control the change in the automation level.

When the driver-requested automation level is in an inapplicable state, the control command device 313 may control procedures of outputting a predetermined notification message notifying that the automation level downward adjustment is required and/or of the driver confirmation for the change in the automation level to be performed.

In some forms of the present disclosure, when it is determined that the level downward adjustment compared to the driver-requested automation level is required, the control command device 313 may control the change confirmation request message for determining whether the driver accepts the corresponding level adjustment to be displayed on the screen. On the other hand, when it is determined that the level upward adjustment compared to the currently active automation level is possible, the control command device 313 may control a simple change information notification message to be displayed on the screen without determining whether the driver accepts the corresponding level adjustment.

When the level downward adjustment compared to the driver-requested automation level is required based on the recognition result, more attention is required to the driver. Therefore, the autonomous driving control device 300 in some forms of the present disclosure may perform the predetermined automation level change confirmation procedure during the automation level downward adjustment, thereby safely performing the automation level downward adjustment only when the driver accepts the change. In this connection, when the driver rejects the automation level downward adjustment, the autonomous driving mode may be deactivated.

On the other hand, when the level upward adjustment compared to the currently active automation level is possible based on the recognition result, relatively less attention of the driver may be required at an automation level to be changed than at the currently active automation level. Therefore, in the case of the automation level upward adjustment, the autonomous driving control device 300 in some forms of the present disclosure may automatically adjust the automation level upward after providing only the simple level change information to the driver without performing the separate procedure of the automation level change confirmation from the driver.

When the automation level downward adjustment is required, the autonomous driving control device 300 in some forms of the present disclosure may control the message to be output using a larger number of message output means as the automation level is changed to a lower automation level. On the other hand, when the automation level upward adjustment is required, the autonomous driving control device 300 may control the message to be output using a smaller number of message output means as the automation level is changed to a higher automation level.

The driver state determination device 314 may determine the state of the driver based on the vehicle internal state information obtained from the vehicle internal information collecting device 305.

In this connection, the driver state may include the distracted state, the driving inability state, the drunk driving state, the drowsy driving state, the fatigue, and the like, but may not be limited thereto.

The user input device 315 may sense a user input based on a control signal received from the HMI 322.

In this connection, the user input may include a predetermined button input signal, a predetermined gesture input signal, and the like for accepting control right transfer from the system to the driver.

In addition, the user input may include a user response signal to the automation level change confirmation request. In this connection, the user response signal may include an acceptance response signal and a rejection response signal.

The control right transfer determination device 316 may determine whether the control right transfer from the system to the driver is required based on at least one of the various recognition information obtained from the recognition device 312, the vehicle internal state information obtained from the vehicle internal information collecting device 305, and/or driver input information obtained from the user input device 315.

When the control right transfer is required as a result of the determination, the control right transfer determination device 316 may transmit a predetermined control signal to the warning alarming device 321 to control a predetermined warning alarm message requesting the control right transfer to the driver to be output.

The lighting controller 317 may control lighting of the direction indicator 323 and the emergency flashing indicator 324.

The failure safety module 318 may determine an optimal failure safety strategy based on a type of a failure sensed during the autonomous driving and a travel situation around the vehicle.

The failure safety module 318 may request the control command device 313 to perform vehicle control based on the determined failure safety strategy.

A detailed configuration and a detailed operation of the failure safety module 318 will become clearer through description of a drawing to be described later.

The braking system 325 may control an operation of an actuator related to the braking and monitor a state of the actuator.

As an example, the braking system 325 may include an electronic parking brake (EPB) that creates a braking force in an electronic manner rather than a physical force of a person.

The posture control system 326 may control an operation of an actuator for stably maintaining a posture of a vehicle body.

As an example, the posture control system 326 may include an electronic stability control (ESC), which is an advanced electronic braking device.

The ESC is a device that controls the posture of the vehicle through cooperative control of the braking force and a driving force of the vehicle. The ESC may provide anti-lock brake system (ABS) and traceability control system (TCS) functions together.

The electronic stability control (ESC) may determine whether the posture of the vehicle body is stably maintained by combining information measured by steering angle, lateral acceleration, yaw-rate, wheel speed sensors, and may operate in a scheme of controlling braking forces of four wheels independently based on such information.

The steering system 327 may control an operation of an actuator that controls a lateral behavior of the vehicle.

For example, the steering system 327 may include a motor driven power steering (MDPS). The MDPS is a device that assists driver handling using an electronic motor, not an oil pressure, which may include a dual power input structure and multiple signal channels for stable power supply and signal transmission/reception.

The shift system 328 may control an operation of an actuator for automatic shift.

As an example, the shift system 328 may include an automatic transmission control unit (TCU).

The transmission control unit (TCU) may determine a shift stage number and a timing based on a TPS, the vehicle speed, the number of engine rotations, a brake switch input, and the like to control an automatic transmission.

The driving system 329 may control an operation of an actuator that controls the longitudinal behavior—that is, the travel speed of the vehicle. For example, the actuator for controlling the longitudinal behavior may include a throttle, an accelerator, and the like.

For example, the driving system 329 may include an engine management system (EMS).

The EMS may perform electronic throttle control, gasoline direct injection, idle stop and go functions.

The other systems 330 may include a tire pressure measurement system for measuring a tire air pressure such as a tire pressure monitoring system (TPMS), a fuel tank sensing system, a battery management system disposed in a hybrid vehicle and an electric vehicle, and the like, but may not be limited thereto.

Figure 4:
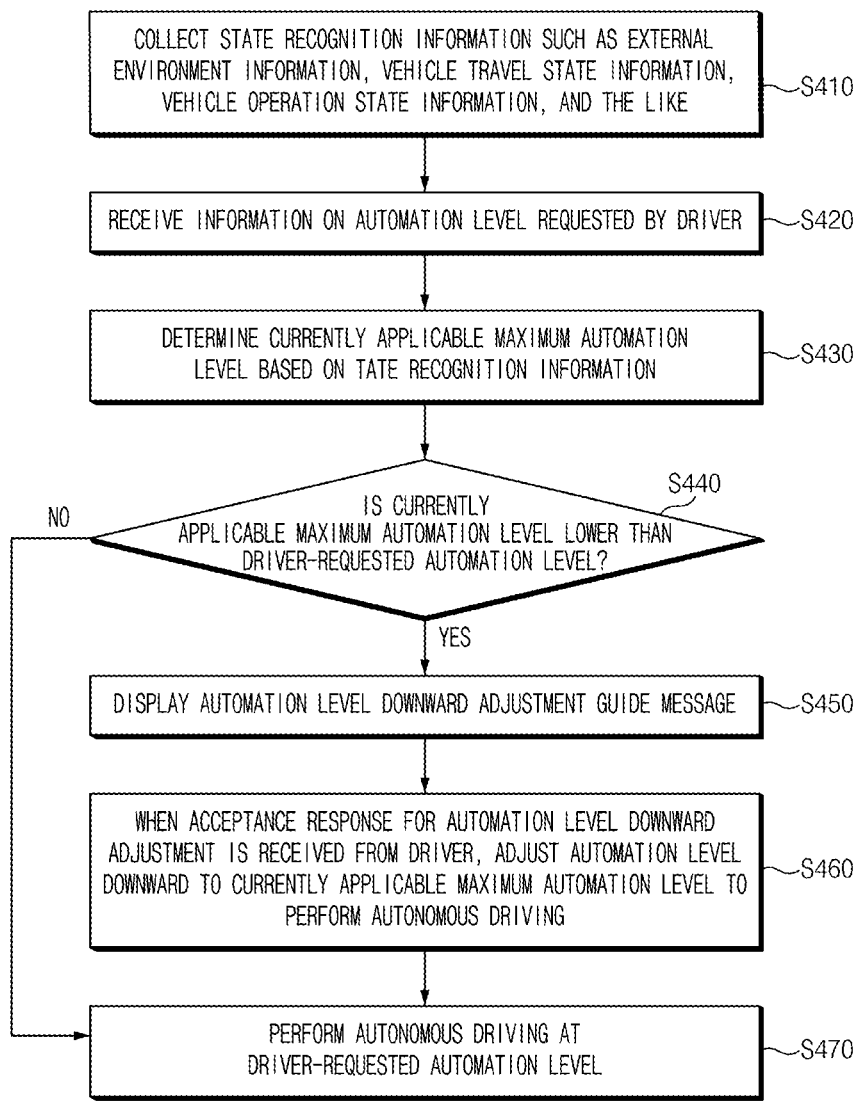
FIG. 4 is a flowchart for illustrating an autonomous driving control method in one form of the present disclosure.

FIG. 4 is a flowchart for illustrating an autonomous driving control method in some forms of the present disclosure.

The form in FIG. 4 may be performed by the autonomous driving controller 200 or the autonomous driving control device 300 described above.

Hereinafter, for convenience of description, the method in FIG. 4 will be described as being performed by the autonomous driving control device 300.

Referring to FIG. 4, the autonomous driving control device may collect state recognition information such as external environment information, vehicle travel state information, vehicle operation state information, and the like during the travel (S410).

The autonomous driving control device may receive the information on the automation level requested by the driver during the initial manual travel (S420).

The autonomous driving control device may determine the currently applicable maximum automation level based on the collected state recognition information (S430).

Whether the change in the automation level—that is, the autonomous driving level—is required may be determined (S440).

For example, the autonomous driving control device may compare the state value "A" recognized in the currently active automation level with a minimum value of the state value "A" defined for each automation level to determine the currently applicable maximum automation level.

The autonomous driving control device may compare the currently applicable maximum automation level with the driver-requested automation level (S440).

When the currently applicable maximum automation level is lower than the driver-requested automation level as the result of the comparison, the autonomous driving control device may display an automation level downward adjustment guide message on the screen (S450). In this connection, the screen may display buttons—for example, an accept button and a reject button—for determining whether the driver accepts the automation level downward adjustment.

When an acceptance response for the automation level downward adjustment is received from the driver, the autonomous driving control device may adjust the automation level downward to the currently applicable maximum automation level to perform the autonomous driving (S460).

When the currently applicable maximum automation level is equal to or greater than the driver-requested automation level as the result of the comparison of operation 440, the autonomous driving control device may perform the autonomous driving at the driver-requested automation level.

It has been described in the above example that the currently applicable maximum automation level is determined based on one state value, but this is merely one form of the present disclosure. The currently applicable maximum automation level may be determined using a plurality of different state values based on the design of the person skilled in the art. As an example, the currently applicable maximum automation level may be determined based on a weight average value for each state A/B/C. In this connection, different weights may be applied to the state values.

When it is determined that the automation level downward adjustment is required, the autonomous driving control device in some forms of the present disclosure may necessarily perform the level change acceptance request/response procedure. In this connection, when the level change acceptance response is received from the driver, the autonomous driving control device may adjust the automation level downward. On the other hand, when a level change rejection response is received from the driver, the autonomous driving control device may deactivate the autonomous driving mode.

Figure 5:
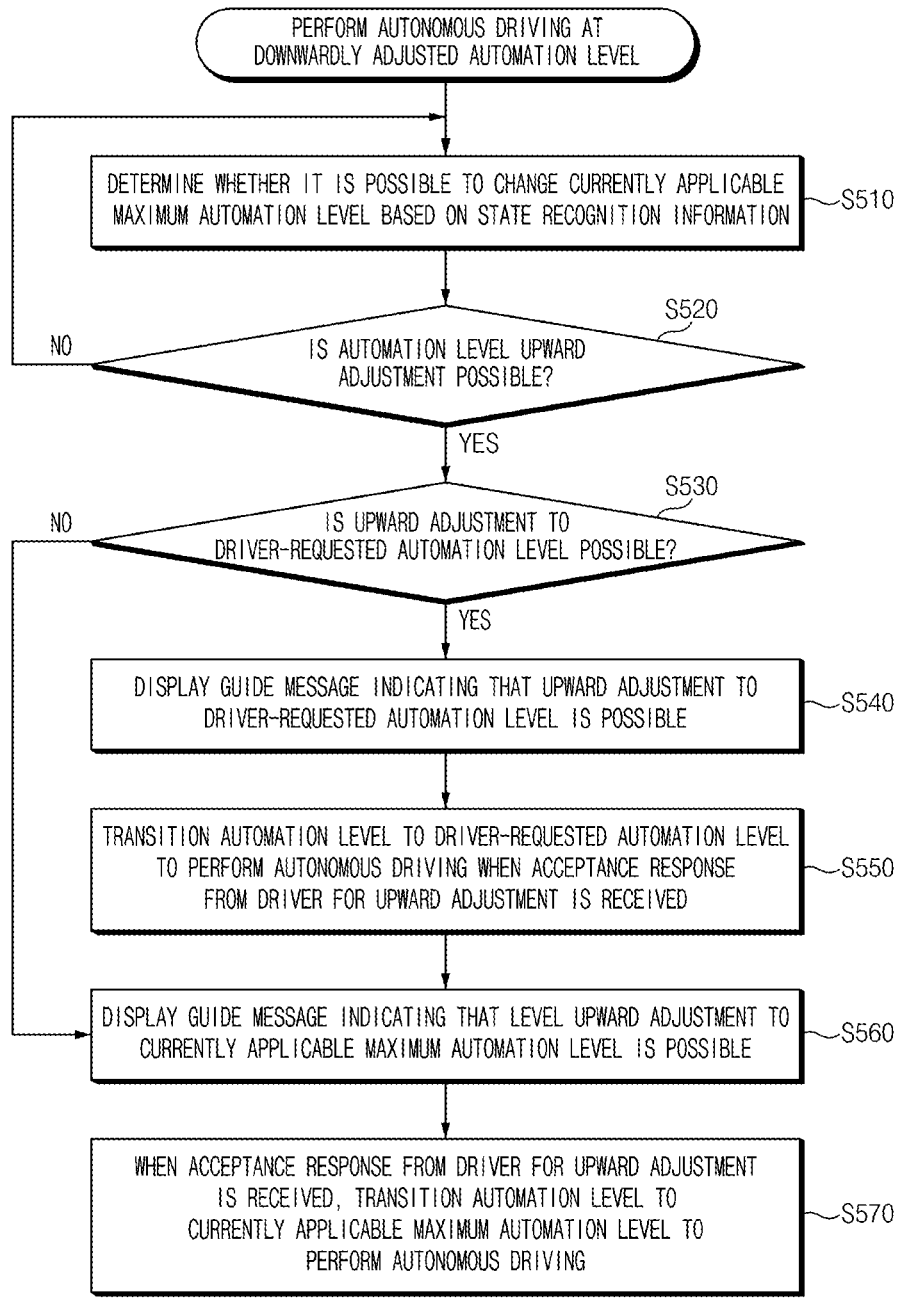
FIG. 5 is a flowchart for illustrating an autonomous driving control method in one form of the present disclosure.

FIG. 5 is a flowchart for illustrating an autonomous driving control method in some forms of the present disclosure.

The form in FIG. 5 may be performed by the autonomous driving controller 200 or the autonomous driving control device 300 described above.

Hereinafter, for convenience of description, the method in FIG. 5 will be described as being performed by the autonomous driving control device 300.

Referring to FIG. 5, the autonomous driving control device may determine whether it is possible to change the currently applicable maximum automation level based on the state recognition information during the autonomous driving at the automation level adjusted downward compared to the driver-requested automation level (S510).

When the automation level is changed to the currently applicable maximum automation level as a result of the determination, the autonomous driving control device may determine whether the automation level upward adjustment is possible (S520).

When the automation level upward adjustment is possible as the result of the determination of operation 520, the autonomous driving control device may determine whether the upward adjustment to the driver-requested automation level is possible (S530).

When the upward adjustment to the driver-requested automation level is possible as the result of the determination of operation 530, the autonomous driving control device may display a predetermined guide message indicating that the level upward adjustment to the driver-requested automation level is possible on the screen (S540). In this connection, the guide message may include buttons—for example, an accept button and a reject button for determining whether the driver accepts the corresponding level upward adjustment.

When an acceptance response from the driver for the upward adjustment to the driver-requested automation level is received, the autonomous driving control device may transition the automation level to the driver-requested automation level to perform the autonomous driving (S550). In this connection, when a rejection response from the driver for the level upward adjustment is received, the autonomous driving control device may maintain the currently active automation level as it is. In another form of the present disclosure, when the rejection response from the driver for the level upward adjustment is received, the autonomous driving control device may deactivate the autonomous driving mode.

When the upward adjustment to the driver-requested automation level is impossible in operation 530, the autonomous driving control device may display a guide message indicating that the level upward adjustment to the currently applicable maximum automation level is possible (S560).

When an acceptance response from the driver for the upward adjustment to the currently applicable maximum automation level is received, the autonomous driving control device may transition the automation level to the currently applicable maximum automation level to perform the autonomous driving (S570). In this connection, when a rejection response from the driver for the level upward adjustment is received, the autonomous driving control device may maintain the currently active automation level as it is. In another form of the present disclosure, when the rejection response from the driver for the level upward adjustment is received, the autonomous driving control device may also deactivate the autonomous driving mode.

When it is determined that the automation level upward adjustment is required, the autonomous driving control device in another form of the present disclosure may not perform the driver confirmation procedure for the automation level upward adjustment.

Figure 6:
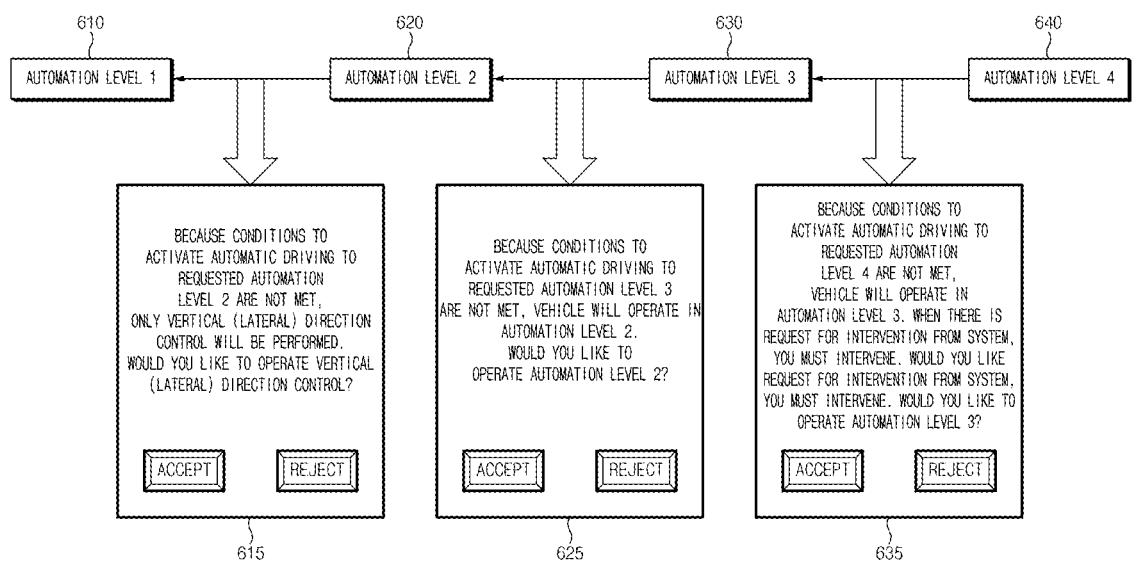
FIG. 6 is a diagram for illustrating an automation level downward adjustment procedure in one form of the present disclosure.

FIG. 6 is a diagram for illustrating an automation level downward adjustment procedure in some forms of the present disclosure.

The form in FIG. 6 may be performed by the autonomous driving controller 200 or the autonomous driving control device 300 described above.

Hereinafter, for convenience of description, a procedure in FIG. 6 will be described as being performed by the autonomous driving control device 300.

Referring to FIG. 6, when it is determined that the level downward adjustment compared to the driver-requested automation level is required, the autonomous driving controller 200 or the autonomous driving control device 300 may output a message for identifying the acceptance/rejection of the driver for the corresponding level downward adjustment.

In some forms of the present disclosure, when the driver-requested automation level is an automation level 2 620, and when level downward adjustment to an automation level 1 610 is required, the autonomous driving control device 300 may configure a first screen 615 including a guide phrase "Because conditions to activate automatic driving to the requested automation level 2 are not met, only vertical (lateral) direction control will be performed. Would you like to operate the vertical (lateral) direction control?" and/or accept/reject buttons, and output the first screen 615 on one side of a provided display screen. For example, the display screen may include a cluster, but may not be limited thereto, and a head-up display and a navigation screen may be used as the display screen. In the automation level 1, at least one of a driving controller, a braking controller, and/or a steering controller may separately assist an autonomous driving function.

In some forms of the present disclosure, when the driver-requested automation level is an automation level 3 630, and when level downward adjustment to the automation level 2 620 is required, the autonomous driving control device 300 may configure a second screen 625 including a guide phrase "Because conditions to activate automatic driving to the requested automation level 3 are not met, the vehicle will operate in the automation level 2. Would you like to operate the automation level 2?" and/or accept/reject buttons, and output the second screen 625 on one side of the provided display screen. In the automation level 2 620, all the driving controller, the braking controller, and the steering controller may cooperate to assist the autonomous driving function. In addition, in the automation level 2, both longitudinal and transverse control rights are owned by the system, but the driver must continuously monitor the travel environment.

In some forms of the present disclosure, when the driver-requested automation level is an automation level 4 640, and when level downward adjustment to the automation level 3 630 is required, the autonomous driving control device 300 may configure a third screen 635 including a guide phrase "Because conditions to activate automatic driving to the requested automation level 4 are not met, the vehicle will operate in the automation level 3. When there is a request for intervention from the system, you must intervene. Would you like to operate the automation level 3?" and/or accept/reject buttons, and output the third screen 635 on one side of the provided display screen. In the automation level 3 630, all the driving controller, the braking controller, and the steering controller cooperate to assist the autonomous driving function, and the system monitors the surrounding environment. However, the driver must intervene in response to the intervention request from the system—for example, a control right transfer request and the like—at any time in the automation level 3.

In the form in FIG. 6, the automation level downward adjustment in units of one level has been described as an example, but this is merely one form of the present disclosure. It should be noted that the automation level downward adjustment in units of two or three levels is possible.

Figure 7:
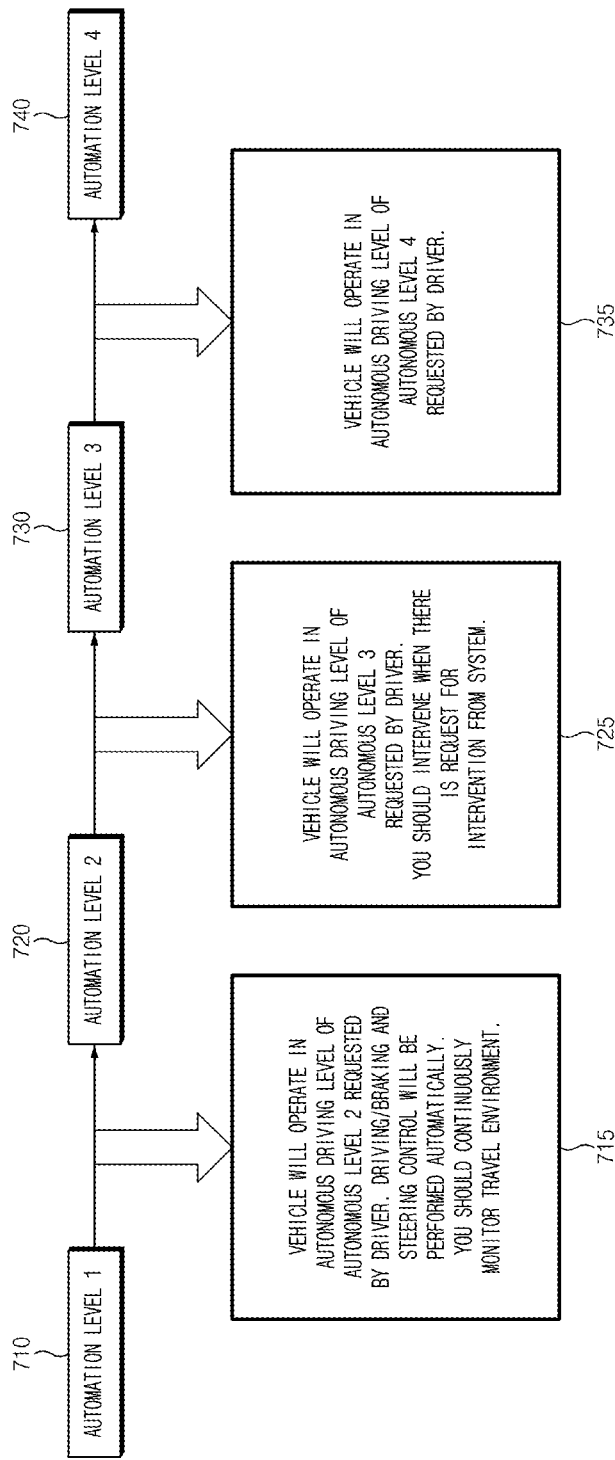
FIG. 7 is a view for illustrating an automation level upward adjustment procedure in one form of the present disclosure.

FIG. 7 is a view for illustrating an automation level upward adjustment procedure in some forms of the present disclosure.

The form in FIG. 7 may be performed by the autonomous driving controller 200 or the autonomous driving control device 300 described above.

Hereinafter, for convenience of description, a procedure in FIG. 7 will be described as being performed by the autonomous driving control device 300.

Referring to FIG. 7, when it is determined that the automation level upward adjustment is required, the autonomous driving control device 300 may output the guide message for the corresponding level upward adjustment.

In some forms of the present disclosure, when level upward adjustment from an automation level 1 710 to an automation level 2 720 is required, the autonomous driving control device 300 may configure a fourth screen 715 including a guide message "The vehicle will operate in the autonomous driving level of the autonomous level 2. Driving/braking and steering control will be performed automatically. You should continuously monitor the travel environment.", and output the fourth screen 715 on one side of the display screen. For example, the display screen may include a cluster, but may not be limited thereto, and a head-up display and a navigation screen may be used as the display screen. In the automation level 2 720, all the driving controller, the braking controller, and the steering controller may cooperate to assist the autonomous driving function. In addition, in the automation level 2 720, both longitudinal and transverse control rights are owned by the system, but the driver must continuously monitor the travel environment.

In some forms of the present disclosure, when level upward adjustment from the automation level 2 720 to an automation level 3 730 is required, the autonomous driving control device 300 may configure a fifth screen 725 including a guide message "The vehicle will operate in the autonomous driving level of the autonomous level 3. You should intervene when there is the request for the intervention from the system.", and output the fifth screen 725 on one side of the display screen. In the automation level 3 730, all the driving controller, the braking controller, and the steering controller cooperate to assist the autonomous driving function, and the system monitors the surrounding environment. However, the driver must intervene in response to the intervention request—for example, the control right transfer request and the like—from the system at any time in the automation level 3.

In some forms of the present disclosure, when level upward adjustment from the automation level 3 730 to an automation level 4 740 is required, the autonomous driving control device 300 may configure a sixth screen 735 including a guide message "The vehicle will operate in the autonomous driving level of the autonomous level 4.", and output the sixth screen 735 on one side of the display screen. In the automation level 4 740, all the driving controller, the braking controller, and the steering controller may cooperate to assist the autonomous driving function, and the system may monitor the surrounding environment to respond without the separate intervention of the driver.

In the form in FIG. 7, the automation level upward adjustment in units of one level has been described as an example, but this is merely one form of the present disclosure. It should be noted that the automation level upward adjustment in units of two or three levels is possible.

Figure 8:
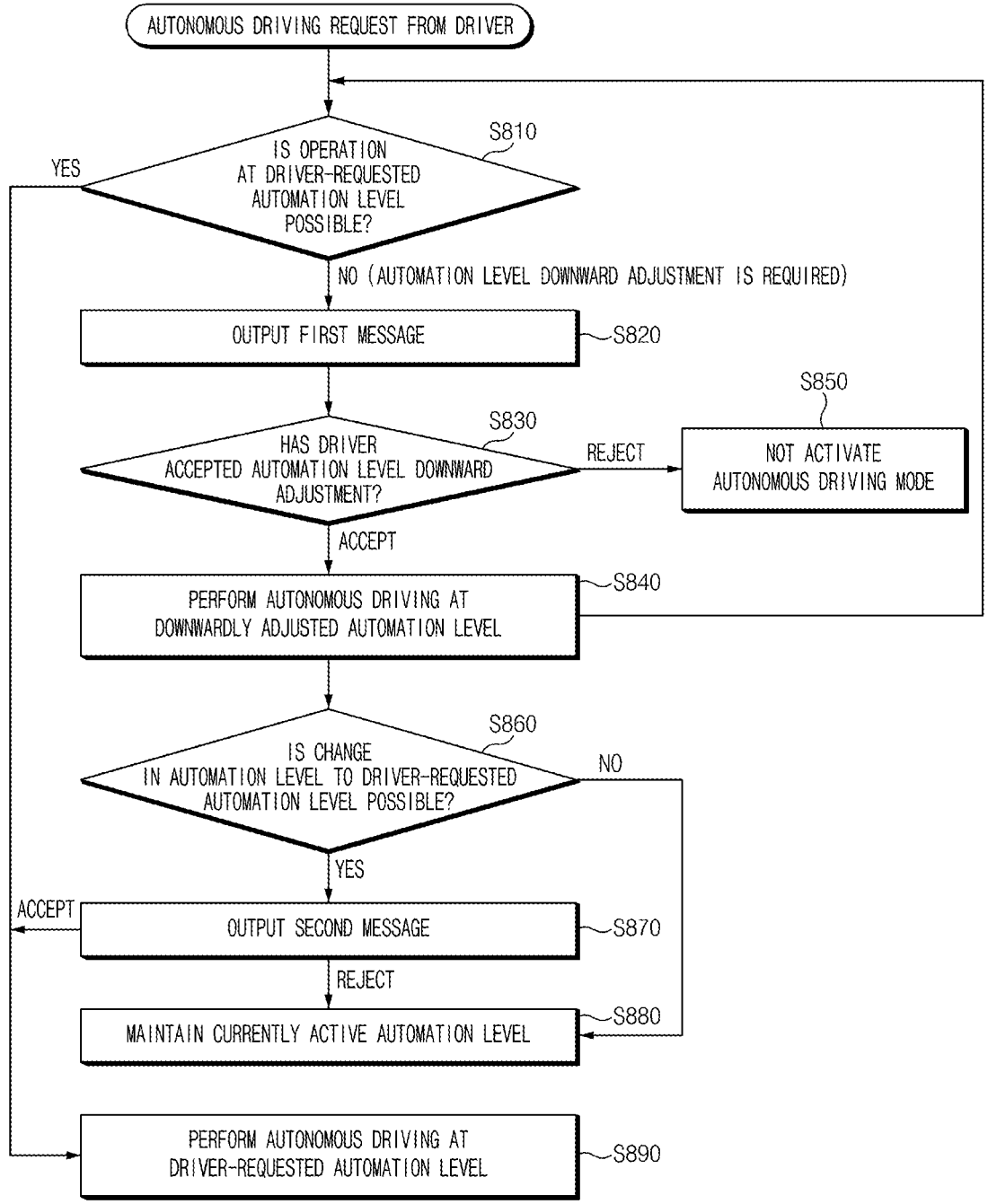
FIG. 8 is a flowchart for illustrating an autonomous driving operating mechanism in one form of the present disclosure.

FIG. 8 is a flowchart for illustrating an autonomous driving operating mechanism in some forms of the present disclosure.

The form in FIG. 8 may be performed by the autonomous driving controller 200 or the autonomous driving control device 300 described above.

Hereinafter, for convenience of description, an operation according to FIG. 8 will be described as being performed by the autonomous driving control device 300.

Referring to FIG. 8, the autonomous driving control device 300 may determine whether operation at the driver-requested automation level is possible in response to an autonomous driving request from the driver during the initial manual travel (S810).

When the operation at the driver-requested automation level is impossible as the result of the determination, the autonomous driving control device 300 may output a first message requesting the driver acceptance for the automation level downward adjustment (S820).

The autonomous driving control device 300 may determine whether the driver accepts the automation level downward adjustment (S830).

The autonomous driving control device 300 may perform the autonomous driving by adjusting the automation level downward to the currently applicable maximum automation level when an acceptance response from the driver for the first message is received (S840).

The autonomous driving control device 300 may not activate the autonomous driving mode when a rejection response from the driver for the first message is received (S850). In this connection, the activation of the autonomous driving mode may be temporarily blocked. For example, the autonomous driving control device 300 may output the first message again after a certain period of time elapses after blocking the activation of the autonomous driving mode to perform the driver confirmation procedure again. As another example, the autonomous driving control device 300 may output the first message for performing the driver confirmation procedure based on the increase in the applicable maximum automation level based on the state recognition information after blocking the activation of the autonomous driving mode.

When the operation at the driver-requested automation level is possible as the result of the determination of operation 810, the autonomous driving control device 300 may perform the autonomous driving at the driver-requested automation level (S890).

While performing the autonomous driving at the automation level adjusted downwardly, the autonomous driving control device 300 may determine whether the change in the automation level to the driver-requested automation level is possible (S860).

When the change in the automation level to the driver-requested automation level is possible as the result of the determination, the autonomous driving control device 300 may output a second message requesting the driver acceptance for the automation level upward adjustment on the screen (S870).

When the change in the automation level to the driver-requested automation level is impossible as the result of the determination, the autonomous driving control device 300 may maintain the currently active automation level to perform the autonomous driving (S880).

When the driver acceptance response for the second message is received, the autonomous driving control device

300 may transition the automation level to the driver-requested automation level to perform the autonomous driving.

On the other hand, when the driver rejection response to the second message is received, the autonomous driving control device 300 may maintain the currently active automation level to perform the autonomous driving (S880).

In another form of the present disclosure, the second message may not include buttons for determining whether the driver accepts the automation level upward adjustment. In this case, after a certain period of time has elapsed after the second message is output, the autonomous driving control device 300 may automatically adjust the automation level upward to the driver-requested automation level to perform the autonomous driving.

The operations of the method or the algorithm described in some forms of the present disclosure may be embodied directly in hardware or a software module executed by the processor, or in a combination thereof. The software module may reside on a storage medium (that is, the memory and/or the storage) such as a RAM, a flash memory, a ROM, an EPROM, an EEPROM, a register, a hard disk, a removable disk, and a CD-ROM.

The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary forms of the present disclosure are provided to explain the spirit and scope of the present disclosure, but not to limit them, so that the spirit and scope of the present disclosure is not limited by the forms of the present disclosure. The scope of the present disclosure should be construed on the basis of the accompanying claims, and all the technical ideas within the scope equivalent to the claims should be included in the scope of the present disclosure.

The present disclosure has an advantage of providing the method and the device for controlling the autonomous driving capable of adaptively switching the automation level of the autonomous driving based on the change in the environment.

In addition, the present disclosure has an advantage of providing the method and the device performing the autonomous driving by adjusting the automation level downward to the currently applicable maximum automation level even when the operation conditions corresponding to the driver-requested automation level are not satisfied without waiting for the operation conditions to be satisfied, thereby reflecting an autonomous driving will of the driver to the maximum.

In addition, the present disclosure has an advantage of providing the method and the device for controlling the autonomous driving capable of safely switching the automation level by adaptively performing the guide message output and/or the driver confirmation procedures when the automation level adjustment is required.

In addition, the present disclosure has an advantage of improving driver convenience by supporting the autonomous driving by adjusting the automation level downward through the driver confirmation procedure after identifying operable automation level even when the autonomous driving at the automation level requested by the driver is impossible because of a temporary sensor failure, a travel environment unsuitable for the autonomous driving, and the like.

In addition, the device for controlling the autonomous driving according to the present disclosure has an advantage of providing a safe autonomous driving service by adaptively performing the guide message output and/or the driver confirmation procedures depending on whether the automation level adjustment is the downward adjustment or the upward adjustment.

In addition, various effects that are directly or indirectly identified through the present document may be provided.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for controlling autonomous driving by a device, the method comprising:
   collecting state recognition information during travel;
   receiving information on a driver-requested automation level by a driver during an initial manual travel;
   determining a currently applicable maximum automation level based on the collected state recognition information;
   comparing the driver-requested automation level with the currently applicable maximum automation level;
   determining that automation level downward adjustment is required, when the currently applicable maximum automation level is lower than the driver-requested automation level; and
   when it is determined that the automation level downward adjustment is required, adjusting an automation level downward to the currently applicable maximum automation level to perform the autonomous driving, when it is determined that the driver accepts a corresponding automation level downward change.

2. The method of claim 1, wherein the state recognition information includes at least one of external environment recognition information, travel state recognition information, driver state recognition information, precise map information, or vehicle operation state information.

3. The method of claim 2, further comprising:
   when it is determined that the automation level downward adjustment is required, displaying, on a screen, a first message including a corresponding automation level change guide phrase and buttons for determining whether the driver accepts the corresponding automation level downward change.

4. The method of claim 3, further comprising:
   when it is determined that the driver accepts the corresponding automation level downward change, adjusting the driver-requested automation level downward to the currently applicable maximum automation level to perform the autonomous driving.

5. The method of claim 3, further comprising:
when it is determined that the driver does not accept the corresponding automation level downward change, temporarily blocking activation of an autonomous driving mode.

6. The method of claim 2, wherein the external environment recognition information includes at least one of line recognition state information, current travel road type information, current travel road traffic volume information, current travel road accident and construction information, current weather information, or communication state information.

7. The method of claim 1, further comprising:
determining whether automation level upward adjustment is possible based on the state recognition information during the autonomous driving at a downwardly adjusted automation level; and
when it is determined that the automation level upward adjustment is possible, displaying, on a screen, a second message including a corresponding automation level upward adjustment guide phrase.

8. The method of claim 7, further comprising:
not performing a driver confirmation procedure during the automation level upward adjustment.

9. The method of claim 7, wherein at least one of the automation level downward change or the automation level upward change includes an automation level change in units of levels equal to or greater than 2.

10. The method of claim 1, further comprising:
changing the automation level based on a driver response signal received through a human machine interface (HMI) after outputting a first message.

11. A device for controlling autonomous driving, the device comprising:
a memory storing program instructions; and
a processor configured to execute the program instructions, the program instructions when executed configured to:
collect state recognition information during travel;
receive information on a driver-requested automation level by a driver during an initial manual travel;
determine a currently applicable maximum automation level based on the collected state recognition information;
compare the driver-requested automation level with the currently applicable maximum automation level;
determining that automation level downward adjustment is required, when the currently applicable maximum automation level is lower than the driver-requested automation level; and
adjust an automation level downward to the currently applicable maximum automation level to perform the autonomous driving when it is determined that the driver accepts a corresponding automation level downward change.

12. The device of claim 11, wherein the state recognition information includes at least one of external environment recognition information, travel state recognition information, driver state recognition information, precise map information, or vehicle operation state information.

13. The device of claim 12, wherein the external environment recognition information includes at least one of line recognition state information, current travel road type information, current travel road traffic volume information, current travel road accident and construction information, current weather information, or communication state information.

14. The device of claim 11, wherein the program instructions when executed are further configured to display a first screen, using a display device, including a corresponding automation level change guide phrase and buttons for determining whether the driver accepts the corresponding automation level downward change when it is determined that the automation level downward adjustment is required.

15. The device of claim 14, wherein the program instructions when executed are further configured to adjust the driver-requested automation level downward to the currently applicable maximum automation level to perform the autonomous driving when it is determined that the driver accepts the corresponding automation level downward change.

16. The device of claim 14, wherein the program instructions when executed are further configured to temporarily block activation of an autonomous driving mode when it is determined that the driver does not accept the corresponding automation level downward change.

17. The device of claim 14, wherein the program instructions when executed are further configured to
determine whether automation level upward adjustment is possible based on the state recognition information during the autonomous driving at the downwardly adjusted automation level, and
display a second screen, using the display device, including a corresponding automation level upward adjustment guide phrase when it is determined that the automation level upward adjustment is possible.

18. The device of claim 17, wherein the program instructions when executed are further configured to not perform a driver confirmation procedure during the automation level upward adjustment.

19. The device of claim 17, wherein at least one of the automation level downward change or the automation level upward change includes an automation level change in units of levels equal to or greater than 2.

20. The device of claim 17, wherein the program instructions when executed are further configured to change the automation level based on a driver response signal received through a human machine interface (HMI) after displaying the first screen and the second screen.

* * * * *